Patented Oct. 8, 1940

2,216,867

UNITED STATES PATENT OFFICE 2,216,867

MANUFACTURE OF COLORING MATTER

Max Wyler, Blackley, Manchester, England, assignor to Imperial Chemical Industries Limited, a corporation of Great Britain No Drawing. Application May 27, 1936, Serial No. 82,147. In Great Britain June 4, 1935

7 Claims. (Cl. 260—314)

This invention relates to the manufacture of coloring matters of the phthalocyanine series. More particularly this invention deals with the manufacture of copper phthalocyanines.

It is an object of this invention to provide an efficient and economical process for producing these metal phthalocyanines. Other and further objects of this invention will appear as the description proceeds.

In British patents Nos. 322,169, 389,842 and 410,814, there are described a series of coloring matters obtainable for instance by reacting phthalonitrile and copper or copper compounds; ortho-cyano-benzamide with iron, nickel, chromium, lead or manganese in the form of free metal or in the form of oxides, sulfides or carbonates; or by passing ammonia into a melt of phthalic anhydride, phthalamide or phthalimide in the presence of a metal or metal oxide or sulfide.

The coloring matters so obtained have been named generically metal-phthalocyanines, and individually copper-phthalocyanine, iron-phthalocyanine, etc., according to the metal which they contain. A more detailed discussion of their structure is contained in a series of articles by Linstead et al., in the Journal of the Chemical Society for 1934, pages 1016 to 1039.

The processes of the two earlier British patents above mentioned have the advantage of starting with relatively inexpensive initial material. The organic initial material mentioned in these patents is phthalic anhydride, phthalimide, phthalic acid diamide and ortho-cyano benzamide, the corresponding derivatives of naphthalene and anthracene, or nuclear substitution derivatives of these compounds. These processes, however, do not give such good yields and such high quality products as that of the subsequent process of Br. 410,814, wherein an ortho-arylene-dicyanide is employed. The latter, however, has the disadvantage that the initial material is relatively more expensive, and has to be specially synthesized from the initial material first mentioned.

The present invention relates to a process for the manufacture of copper phthalocyanines in good yield from starting materials different from those hitherto used and easily accessible, or in improved yield when known starting materials are used.

I have found that when an ammonium phthalate is heated with substances yielding copper (i. e., the metal itself or salts, e. g., halides, acetates, may be used) and with an aminosulphonic acid or a salt thereof, then copper phthalocyanines are formed.

Usually the metal is added to the reaction mixture in the form of salts, and the reaction then proceeds smoothly at 220° C. to 260° C. conveniently at 240° C. to 250° C.; when free metal is used they are to be in a state of fine division and a somewhat higher temperature is needed.

The process appears to involve a dehydration, and agreeably to this interpretation there may be used instead of an ammonium phthalate another derivative of the corresponding phthalic acid. Thus the phthalic diamides, or the salts of the phthalamic acids or the o-cyanobenzoic acids, or the o-cyanobenzamides may be used. Also, as the ammonium phthalates may be formed in situ, it is possible to use a phthalimide or a phthalic anhydride or a free phthalic acid, sufficient ammonia being of course provided, as by use of another ammonium salt. In this respect the invention may be regarded as an improvement on that described in British Specification No. 322,169, the improvement being that the process is technically more feasible and in particular that higher yields are obtained. The same may be said when cyanobenzamides are used (compare British Specification No. 389,842).

The term an aminosulphonic acid or a salt thereof is intended to include aminosulphonic acid (sulphaminic acid) and iminodisulphonic acid and their salts and the nitrilosulphonates (see Inorganic Chemistry, Ephraim, trans. Thorne, London and Edinburgh, 1926, page 540).

More particularly, I select as initial material phthalic acid or a salt thereof, for instance ammonium phthalate or one of the compounds obtainable at least theoretically in the successive dehydration and deamidation of ammonium phthalate, for instance phthalamic acid, ammonium phthalamate, phthalic anhydride, phthalic acid diamide (phthalamide), phthalimide, or ortho-cyano-benzamide. In lieu of the above particular compounds, their nuclear substitution derivatives may be employed, for instance mono- or di-halogen, mono- or di-nitro compounds, sulfonic acid derivatives and others. Also, in lieu of the mentioned compounds of the phthalic acid family, the corresponding derivatives from naphthalene- or anthracene-ortho-dicarboxylic acids may be employed. More specifically, 4-chlorophthalic anhydride, and 3- and 4-nitrophthalic anhydrides or other corresponding derivatives of the respective acids may be mentioned. The sulphophthalic acids are likewise adapted to serve as starting materials, and give characteristic products, soluble in water.

The said initial material is mixed with a salt of copper, for instance cuprous or cupric chloride, cuprous or cupric acetate, or the corresponding amino-sulfonates.

To these is added an amino-sulfonic acid or a salt thereof, for instance amino-sulfonic acid, iminodisulfonic acid, salts thereof or salts of nitrilo-trisulfonic acid ($N(SO_3H)_3$). Since the presence of ammonium compounds is favorable to the reaction, it is preferable to select as salts of the said amino-sulfonic acids their corresponding ammonium compounds. Alternatively, as already indicated, one may select the amino-sulfonates in the form of a copper salt.

Without limiting my invention to any particular procedure, the following examples are given to illustrate my preferred mode of operation. Parts mentioned are by weight.

Example 1

7 parts of ammonium phthalate,

$C_6H_4(COONH_4)_2$, 7 parts of ammonium amino-sulfonate and 2 parts of copper acetate are well mixed and heated. The mixture becomes partly fluid at about 220° C. and blue at about 240° C. It is kept at 240 to 250° C. until formation of coloring matter is complete. The mixture is cooled, ground, boiled with water and filtered. The solid matter is dried, dissolved in 10 parts of 94% sulfuric acid, poured into 100 parts of water, filtered, washed free of acid and dried. Copper phthalocyanine is thus obtained in good yield.

Example 2

The process of Example 1 is carried out, but using 1½ parts of anhydrous cupric chloride instead of the copper acetate, the heating being similar and the product being isolated in the same way.

Example 3

7 parts of phthalamide, 5 parts of amino-sulfonic acid and 2 parts of cuprous acetate are well mixed and heated at 220 to 240° C. until no more coloring matter is formed. It is isolated as in Example 1 and appears to be the same compound.

Example 4

7 parts of phthalamide and 7 parts of the cupric salt of amino-sulfonic acid are heated and the coloring matter isolated as in Example 1. It appears to be the same compound.

Example 5

The process of Example 3 is repeated, but with 6 parts of ammonium amino-sulfonate instead of the 5 parts of amino-sulfonic acid. The same product is obtained in good yield.

Example 6

The process of Example 1 is repeated but using the following materials instead of those previously stated; namely, 8 parts of ammonium phthalamate, 9 parts of ammonium amino-sulfonate and 1½ parts of anhydrous cupric chloride. A copper phthalocyanine is obtained in good yield.

Example 7

8 parts of ammonium phthalate, 20 parts of sodium dipotassium nitrilotrisulfonate and 2 parts of anhydrous cupric chloride are mixed and heated for 2½ hours at 260° C. The product is isolated as described in Example 1, the same substance being obtained.

Example 8

10 parts of phthalamide, 30 parts of sodium dipotassium nitrilotrisulfonate, and 4 parts of anhydrous cuprous bromide are mixed and heated for 2½ hours at 260° C. A blue copper phthalocyanine is obtained.

Example 9

33 parts of phthalamide, 46 parts of ammonium amino-sulfonate and 5 parts of anhydrous cuprous chloride are heated at 230° C. and the product is worked up as described in the preceding examples. 11 parts of blue pigment are obtained.

Example 10

6 parts of phthalic anhydride, 6 parts of ammonium chloride, 12 parts of ammonium amino-sulfonate and 1.5 parts of anhydrous cupric chloride are heated at 240° C. for 2 hours. The product is isolated as in Example 1. It is a blue coloring matter.

Example 11

66 parts of phthalimide, 90 parts of ammonium amino-sulfonate and 16 parts of anhydrous cupric chloride are mixed and heated for 2 hours at 220° C. The product is isolated as in Example 1. It is a blue coloring matter.

Example 12

33 parts of phthalimide, 45 parts of ammonium amino-sulfonate and 3.8 parts of finely divided copper powder are heated to 280° C. and kept at 280–290° C. until no more coloring matter is formed. The product is isolated as in Example 1. It is a blue coloring matter.

In all the above examples the metal entering into combination has been copper. Nickel and iron behave likewise.

Thus, other examples are given in the following table, wherein also certain substituted phthalic compounds are mentioned. The procedure and proportions were as indicated in Examples 1 to 6 above. The temperature was kept at 220° C. in each case.

| Phthalic acid derivative | Amino-sulfonic acid compound | Metal compound used | Product |
|---|---|---|---|
| Ammonium-4, 5-dichloro-phthalate | Sodium nitrilo-sulfonate | Cupric chloride | Bright blue-green pigment. |
| 4-sulphophthalic acid | Ammonium sulphamate | do | Blue, water-soluble coloring matter. |

In all the examples, solvents or suspension media may be employed to assist in the manipulation. Suitable media for this purpose are indifferent organic liquids of conveniently high boiling point, for instance naphthalene, beta-methyl-naphthalene or crude chloro-naphthalene.

The copper phthalocyanines are useful pigments, being bright blue. For technical purposes pigments must satisfy various demands in which particular physical properties (fineness of division, non-crystalline form, freedom from impurities) are of great importance. The products of the present invention in its preferred embodiments are obtained in such a form that they are excellently suited for use as pigments; the process being such that any excess of reagent is readily removed, and the shades of the pigments being very bright.

Ammonia may be passed through the reaction mass if desired.

Other variations and modifications may be made, within the scope of the prior British patents above mentioned, as will be readily apparent to those skilled in the art.

It will be clear from the above discussion and examples that my invention is applicable to the manufacture of metal phthalocyanines by starting out with the respective metalliferous reagent, that is respective free metal or a salt thereof, and using any of the following organic or mixed initial materials:

ammonium phthalate $C_6H_4(COONH_4)_2$
phthalic acid + ammonia $C_6H_4(COOH)_2+2NH_3$
phthalic anhydride+ammonia
$$C_6H_4(CO)_2O+2NH_3$$
phthalic acid diamide $C_6H_4(CONH_2)_2$
phthalimide + ammonia $C_6H_4(CO)_2NH$
o-cyano-benzamide $C_6H_4(CN)(CONH_2)$
phthalamic acid + ammonia
$$C_6H_4(CONH_2)(COOH)+NH_3$$
ammonium phthalamate
$$C_6H_4(CONH_2)(COONH_4)$$
ammonium salt of o-cyanobenzoic acid
$$C_6H_4(CN)COONH_4$$

also, nuclear substitution derivatives of the above compounds, as well as the corresponding derivatives of the naphthalene or anthracene series. Off hand this appears as a very much diversified group of initial materials, comprising in certain cases a single compound, and in other cases the combination of two compounds, more particularly an organic compound plus ammonia. On closer inspection, however, it will be observed that all the members of the above diversified group possess the one property in common of possessing a structure adapted to yield an ortho-arylene dicyanide upon dehydration. It is conceivable, that such a dehydration, with intermediate formation of a dinitrile, actually takes place during the course of the reaction, inasmuch as the latter involves heating at an elevated temperature, and inasmuch as the resulting color, for instance copper phthalocyanine $$[C_6H_4(CN)_2]_4 \cdot Cu,$$

has a structure involving four nuclei of phthalonitrile. But regardless whether such conversion actually takes place or not, it is convenient for the purpose of classification, to regard the initial materials above mentioned as potential formers of o-arylene-dicyanides. Consequently, in the claims below the expression "initial material adapted to be converted into an o-arylene-dicyanide by dehydration", or other expressions to the same effect, should be understood as a generic expression for the various initial materials above listed, or the equivalents, regardless whether these consist of a single organic compound or of a pair of compounds as hereinabove pointed out. Similarly, the expression "potential phthalonitrile-forming initial material" shall likewise be understood as a generic expression to initial materials of the above group which are, at least in theory, capable of yielding pthalonitrile by dehydration.

The metalliferous reagent employed in conjunction with the above initial materials may according to this invention be any chemical substance which is adapted to furnish a metal of the group formed by copper and the magnetic metals. It may take the form of the free metal or of a salt thereof. It may even be combined with the amino-sulfonic acid employed, in the form of a salt thereof.

On the other hand the amino-sulfonic acid compound itself may be in the form of free acid, in the form of an ammonium salt, an alkali-metal salt or a salt of the metal whose phthalocyanine it is desired to form in the reaction. In other words, this reagent may be in the form of free acid or in the form of such salts thereof which are not inconsistent with the general object of the process.

I claim:

1. The process of producing copper phthalocyanine which comprises fusing together potential phthalonitrile forming initial material, and a halide of copper, in the presence of ammonium sulphamate.

2. In the process of producing a coloring matter of the copper phthalocyanine series by reacting initial material adapted to be converted into an o-arylene dicyanide by dehydration, with a reagent adapted to furnish copper, the improvement which comprises effecting the reaction in the presence of an amino sulfonic acid compound selected from the group consisting of amino-sulfonic acid, imino-disulfonic acid, nitrilo-sulfonic acid, and the ammonium, alkali-metal and copper salts thereof.

3. The process of producing copper phthalocyanine which comprises heating potential phthalonitrile-forming initial material with a cupriferous reagent in the presence of a compound of the general formula $NH_x(SO_3M)_{3-x}$, wherein $x$ stands for one of the numerals 0, 1 and 2, while M stands for hydrogen, ammonium, an alkali metal or copper, and recovering the coloring matter thus produced.

4. The process of producing a copper phthalocyanine, which comprises heating a diammonium phthalate with a cupriferous reagent in the presence of a compound of the general formula $NH_x(SO_3M)_{3-x}$, wherein $x$ stands for one of the numerals 0, 1 and 2, while M stands for hydrogen, ammonium, an alkali metal or copper, and recovering the coloring matter thus produced.

5. The process of producing a copper phthalocyanine, which comprises heating a phthalic diamide with a cupriferous reagent in the presence of a compound of the general formula $NH_x(SO_3M)_{3-x}$, wherein $x$ stands for one of the numerals 0, 1 and 2, while M stands for hydrogen, ammonium, an alkali metal or copper, and recovering the coloring matter thus produced.

6. The process of producing copper phthalocyanine which comprises fusing together diammonium phthalate and a halide of copper, in the presence of ammonium sulphamate.

7. The process of producing a copper phthalocyanine, which comprises heating potential phthalonitrile-forming initial material with reagents adapted to furnish copper and an aminosulfonate ion.

MAX WYLER.